US012237476B2

(12) United States Patent
Golm et al.

(10) Patent No.: US 12,237,476 B2
(45) Date of Patent: Feb. 25, 2025

(54) CONTAINMENT SYSTEM FOR A MULTI-CELL RECHARGEABLE ENERGY STORAGE DEVICE

(71) Applicant: GM GLOBAL TECHNOLOGY OPERATIONS LLC, Detroit, MI (US)

(72) Inventors: Erik B. Golm, Warren, MI (US); Venkateshwar R. Aitharaju, Troy, MI (US); Gustavo Cibrian Salazar, Belle River (CA); Bhavesh Shah, Troy, MI (US); Xiaosong Huang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 492 days.

(21) Appl. No.: 17/747,240

(22) Filed: May 18, 2022

(65) Prior Publication Data

US 2023/0378549 A1    Nov. 23, 2023

(51) Int. Cl.
  *H01M 10/42* (2006.01)
  *B60L 50/64* (2019.01)
  (Continued)

(52) U.S. Cl.
  CPC .......... *H01M 10/425* (2013.01); *B60L 50/64* (2019.02); *B60L 58/26* (2019.02); *H01M 50/204* (2021.01); *H01M 50/249* (2021.01); *H01M 50/271* (2021.01); *H02J 7/0013* (2013.01); *H02J 7/0042* (2013.01); *H02J 7/0063* (2013.01);
  (Continued)

(58) Field of Classification Search
  CPC ............ H01M 10/425; H01M 50/204; H01M 50/249; H01M 50/271; H01M 2220/20; H01M 10/613; H01M 50/244; B60L 50/64; B60L 58/26; B60L 50/66; H02J 7/0013;
  (Continued)

(56) References Cited

U.S. PATENT DOCUMENTS

2012/0156539 A1* 6/2012 Honjo ................. B60K 1/04
                                                        429/100
2016/0156080 A1* 6/2016 Enning ............... H01M 10/625
                                                        429/83

(Continued)

FOREIGN PATENT DOCUMENTS

WO    WO-2013188680 A1 * 12/2013 ............... B60K 6/28

*Primary Examiner* — Abdullah A Riyami
*Assistant Examiner* — Nader J Alhawamdeh
(74) *Attorney, Agent, or Firm* — Quinn IP Law

(57) ABSTRACT

A containment system for a rechargeable energy storage device (RESS) is described includes an enclosure having a first compartment adjoining a second compartment. The first compartment is arranged to house a plurality of power electronics devices, and the second compartment is arranged to house a plurality of battery cells. The second compartment includes a tub that defines a bottom portion, and a floor plate. The tub includes opposed end walls and opposed sidewalls. A top plate is arranged overtop of the first compartment and the second compartment. A first one of the end walls and the top plate define a first slot between the first compartment and the second compartment. A first removable panel is arranged to enclose the first compartment. The plurality of battery cells connect to the plurality of power electronics devices via a high-voltage DC power bus that is arranged to pass through the first slot.

20 Claims, 9 Drawing Sheets

(51) Int. Cl.
    *B60L 58/26*         (2019.01)
    *H01M 50/204*     (2021.01)
    *H01M 50/249*     (2021.01)
    *H01M 50/271*     (2021.01)
    *H02J 7/00*         (2006.01)
    *B60K 1/04*         (2019.01)

(52) U.S. Cl.
    CPC ........ *B60K 1/04* (2013.01); *B60K 2001/0438* (2013.01); *H01M 2220/20* (2013.01); *H02J 2207/20* (2020.01)

(58) Field of Classification Search
    CPC .... H02J 7/0042; H02J 7/0063; H02J 2207/20; B60K 1/04; B60K 2001/0438; Y02E 60/10
    See application file for complete search history.

(56) References Cited

U.S. PATENT DOCUMENTS

| | | | |
|---|---|---|---|
| 2016/0172726 A1* | 6/2016 | Enning | H01M 50/227 |
| | | | 429/120 |
| 2018/0108891 A1* | 4/2018 | Fees | B60L 50/66 |
| 2019/0337402 A1* | 11/2019 | Günther | B60L 50/66 |
| 2021/0210808 A1* | 7/2021 | Schmitz | H01M 10/613 |
| 2022/0059894 A1* | 2/2022 | Stephens | B60K 1/04 |
| 2023/0378549 A1* | 11/2023 | Golm | B60L 50/64 |

\* cited by examiner

CONTAINMENT SYSTEM FOR A MULTI-CELL RECHARGEABLE ENERGY STORAGE DEVICE

INTRODUCTION

A rechargeable energy storage system (RESS) can be employed in a stationary energy storage system or in a mobile device, e.g., as part of an electric vehicle (EV). When employed as part of an EV, an electrified powertrain employs one or multiple electric machines to generate torque employing energy derived at least in part from an RESS, with the generated torque being delivered to a drivetrain for tractive effort. The RESS, which can include a multi-cell battery pack, associated power electronics, thermal regulation hardware, sensors, controllers, etc., may be packaged into a single unit that is assembled into a vehicle at a desired location, e.g., underbody.

Over the service life of a vehicle, there may be a need to service an element of the RESS. On known systems, servicing an element of the RESS may necessitate removal of the complete RESS from the vehicle, which incurs labor and other costs.

SUMMARY

There is a need for a multi-cell rechargeable energy storage system (RESS) that is composed of a multi-cell battery pack, associated power electronics, thermal regulation hardware, sensors, controllers, and in some embodiments a low-voltage auxiliary power module, etc., that is packaged as a single device for assembly into a vehicle while facilitating servicing of individual elements thereof. There is a further need for a containment system for a multi-cell rechargeable energy storage system (RESS) that is arranged as a single device for assembly into a vehicle while facilitating servicing of individual elements thereof.

The concepts described herein provide for a multi-cell rechargeable energy storage system (RESS) and containment system that reduces or eliminates a need to remove the complete RESS from the vehicle to perform service.

A containment system for a rechargeable energy storage device (RESS) is described, and includes an enclosure having a first compartment adjoining a second compartment. The first compartment is arranged to house a plurality of power electronic devices, and the second compartment is arranged to house a plurality of battery cells. The second compartment includes a tub that defines a bottom portion, and a floor plate. The tub includes opposed end walls and opposed sidewalls. A top plate is arranged overtop of the first compartment and the second compartment. A first one of the end walls and the top plate define a first slot between the first compartment and the second compartment. A first removable panel is arranged to enclose the first compartment. The plurality of battery cells connect to the plurality of power electronic devices via a high-voltage DC power bus that is arranged to pass through the first slot.

An aspect of the disclosure includes the first removable panel being arranged to facilitate access to a portion of the first compartment.

Another aspect of the disclosure includes the first compartment being independently accessible from the second compartment via the first removable panel.

Another aspect of the disclosure includes the first compartment being arranged in series with the second compartment along a longitudinal axis.

Another aspect of the disclosure includes the first compartment being arranged in parallel with the second compartment along a longitudinal axis.

Another aspect of the disclosure includes a third compartment and a second removable panel arranged to enclose the third compartment, wherein the third compartment adjoins the second compartment.

Another aspect of the disclosure includes a second one of the end walls and the top plate defining a second slot between the first compartment and the third compartment. The third compartment is arranged to house an auxiliary power module, and the plurality of battery cells connect to the auxiliary power module via the high-voltage DC power bus that passes through the second slot.

Another aspect of the disclosure includes the second removable panel being arranged to facilitate access to a portion of the third compartment.

Another aspect of the disclosure includes the bottom portion of the tub and the floor plate forming a plurality of fluidic channels.

Another aspect of the disclosure includes the floor plate being fabricated from a material having a high coefficient of high thermal conductivity.

Another aspect of the disclosure includes the first compartment being arranged to house a power inverter.

Another aspect of the disclosure includes a load-bearing frame being arranged to structurally support the second compartment.

Another aspect of the disclosure includes the tub including the opposed end walls and opposed sidewalls defining a fluidic bath.

Another aspect of the disclosure includes the fluidic bath being arranged to partially immerse the plurality of battery cells in a coolant fluid.

Another aspect of the disclosure includes a containment system for a rechargeable energy storage system that includes an enclosure having a first compartment adjoining a second compartment that is adjoining a third compartment. The second compartment includes a tub defining a bottom portion, and a floor plate. The tub includes opposed end walls and opposed sidewalls. A top plate is arranged overtop of the first compartment, the second compartment, and the third compartment. A first removable panel is arranged to enclose the first compartment; and a second removable panel arranged to enclose the third compartment. The first compartment is arranged to house a plurality of power electronics devices for a power inverter, the second compartment is arranged to house a plurality of battery cells, and the third compartment is arranged to house an auxiliary power module.

Another aspect of the disclosure includes the first compartment being accessible via the first removable panel.

Another aspect of the disclosure includes the second removable panel being arranged to facilitate access to the third compartment.

Another aspect of the disclosure includes the bottom portion of the tub and the floor plate forming a plurality of fluidic channels.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
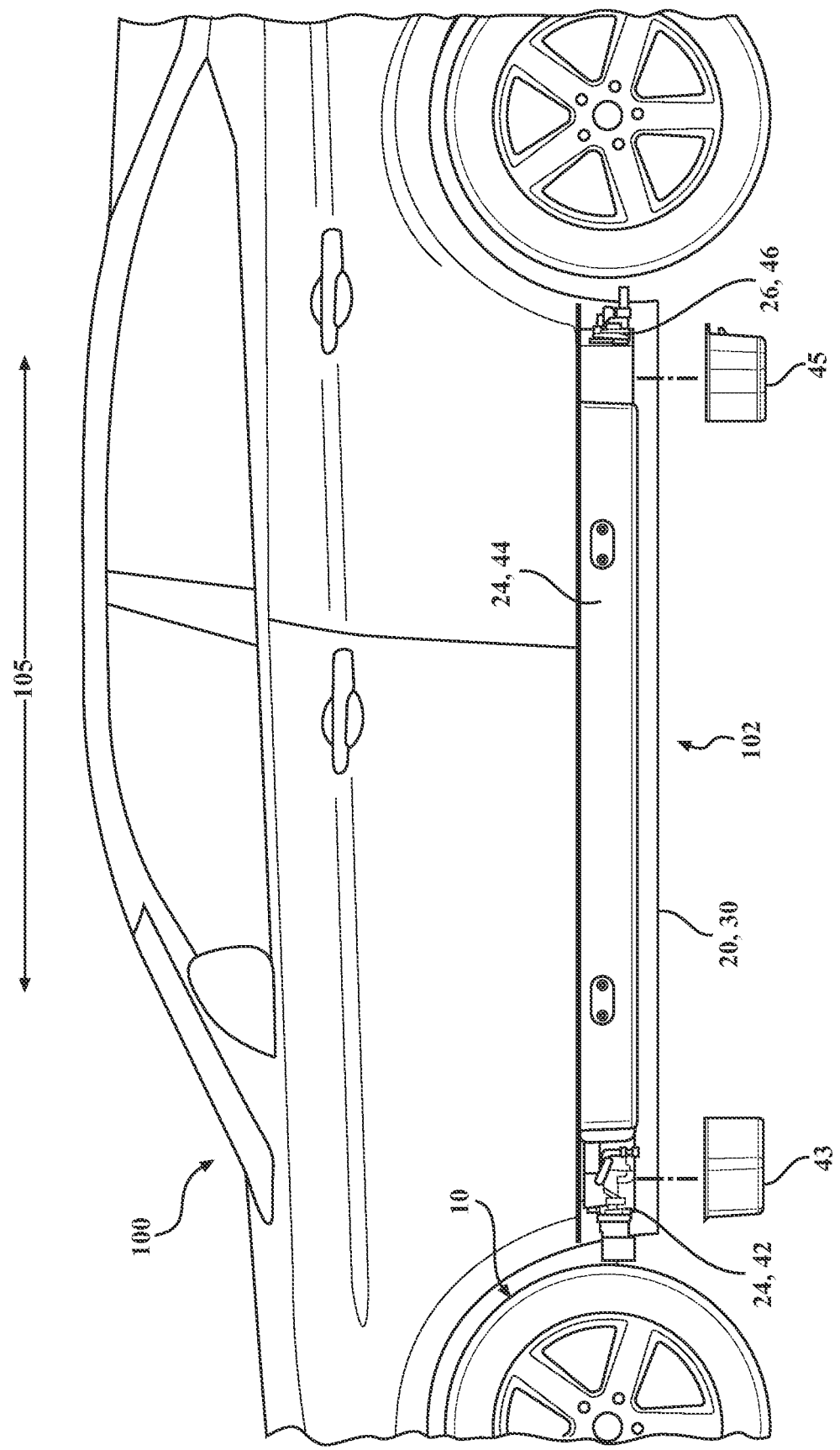
FIG. 1 schematically illustrates a vehicle including a rechargeable energy storage system (RESS), in accordance with the disclosure.

The present disclosure is susceptible to various modifications and alternative forms, and some representative embodiments have been shown by way of example in the drawings and will be described in detail herein. Novel aspects of this disclosure are not limited to the forms illustrated in the drawings. Rather, the disclosure is intended to cover modifications, equivalents, combinations, or alternatives falling within the spirit and scope of the disclosure as defined by the appended claims.

DETAILED DESCRIPTION

The following detailed description is merely exemplary in nature and is not intended to limit the application and uses. Furthermore, the drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure.

Furthermore, the disclosure, as illustrated and described herein, may be practiced in the absence of an element that is not specifically disclosed herein.

The use of ordinals such as first, second and third does not necessarily imply a ranked sense of order, but rather may only distinguish between multiple instances of an act or structure.

Referring to the drawings, wherein like reference numerals are used to identify like or identical components in the various views, FIG. 1 schematically depicts a vehicle 100 having an electrified powertrain 10 that employs a multi-cell rechargeable energy storage system (RESS) 20 that is assembled into a containment system 30. The RESS 20 is attached to an underbody portion 102 of the vehicle 100 between front wheels and rear wheels. The vehicle 100 defines a longitudinal axis 105. In one embodiment, and as shown, the RESS 20 is arranged to supply electric power to one or multiple electric machines in the electrified powertrain 10 to provide tractive effort. The vehicle 100 may include, but is not limited to a mobile platform in the form of a commercial vehicle, industrial vehicle, agricultural vehicle, passenger vehicle, aircraft, watercraft, train, all-terrain vehicle, personal movement apparatus, robot, and the like to accomplish the purposes of this disclosure. The containment system 30 is a multi-compartment enclosure 40 having structural features and lower access panels. The multi-compartment enclosure 40 includes a first compartment 42, a second compartment 44, and in one embodiment, a third compartment 46. The first compartment 42 has a first removable access panel 43, and provides housing to a power inverter 24. The second compartment 44 provides housing to a plurality of interconnected rechargeable battery cells 22, or a plurality of cell modules that each includes a plurality of battery cells. The third compartment 46 has a second removable access panel 45, and provides housing to an auxiliary power module 26.

After assembly of the containment system 30 into the vehicle 100, the power inverter 24 is accessible for service by removal of the first removable access panel 43, without removing the containment system 30 from the vehicle 100 and without affecting the structural integrity of the second compartment 44 or the third compartment 46. After assembly of the containment system 30 into the vehicle 100, the APM 26 is accessible for service by removal of the second removable access panel 45, without removing the containment system 30 from the vehicle 100 and without affecting the structural integrity of the second compartment 44 or the first compartment 42.

Figure 2:
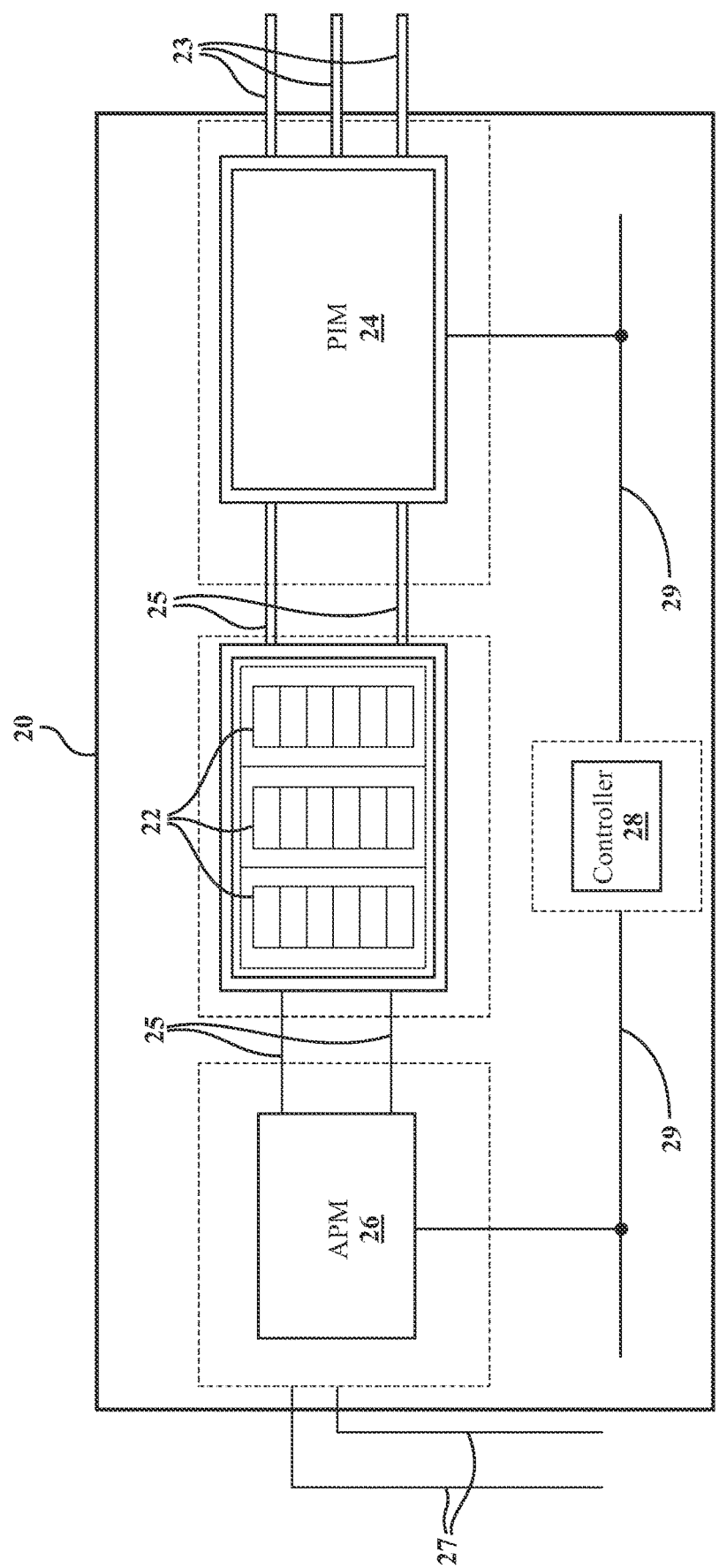
FIG. 2 schematically illustrates an electrical configuration for an embodiment of a rechargeable energy storage system (RESS), in accordance with the disclosure.

FIG. 2 schematically illustrates an electrical configuration for an embodiment of the RESS 20, including the plurality of the battery cells (battery cells) 22, the power inverter 24, and, in one embodiment, the auxiliary power module (APM) 26.

The battery cells 22 electrically connect to the power inverter 24 and the auxiliary power module 26 via a high-voltage DC power bus 25. In one embodiment, the battery cells 22 are configured as cylindrical elements having outer vertical surfaces, and are arranged in multiple rows in close proximity to one another, with electrical connections (not shown) therebetween and in connection with the high-voltage DC power bus 25. In one embodiment, the battery cells 22 are configured as prismatic or pouch-type elements having outer vertical surfaces and bottom surfaces, and are arranged in rows with electrical connections therebetween and in connection with the high-voltage DC power bus 25.

The APM 26 electrically connects to low-voltage electrical systems on the vehicle 100 via a low-voltage DC power bus 27. The low-voltage DC power bus 27 supplies low-voltage DC electric power (e.g., 12V, 18V, or other voltage) to vehicle systems such as lighting, HVAC, infotainment, ride and handling control, etc.

The power inverter 24 electrically connects to one or multiple electric machine(s) via a high-voltage AC power bus 23. The power inverter 24 may contain multiple sets of semiconductor switches and filtering components arranged in phase-specific switching legs, with ON/OFF states of the individual IGBT, MOFSET, or other semiconductor switches changed at a particular rate, e.g., using pulsewidth modulation. Switching control thus enables the power inverter 24 to receive a DC voltage from the battery cell via the high-voltage DC power bus 25, and to output a polyphase/AC voltage (VAC) to the high-voltage AC power bus 23. Phase windings of a rotary electric machine of the electrified powertrain 10 may be electrically connected to the power inverter 24 such that the output torque from the rotary electric machine is delivered to a coupled load, e.g., road wheels.

In one embodiment, one or multiple controller(s) 28 are arranged in the RESS 20. The controller(s) 28 is depicted schematically as a unitary device solely for illustrative simplicity and descriptive clarity. The controller(s) 28 communicate to other on-vehicle systems and controllers via a communication bus 29.

The elements of the RESS 20, including the battery cells 22, power inverter 24, APM 26, power bus 25, and controller(s) 28 are assembled into the containment system 30 as described herein.

Figure 3A:
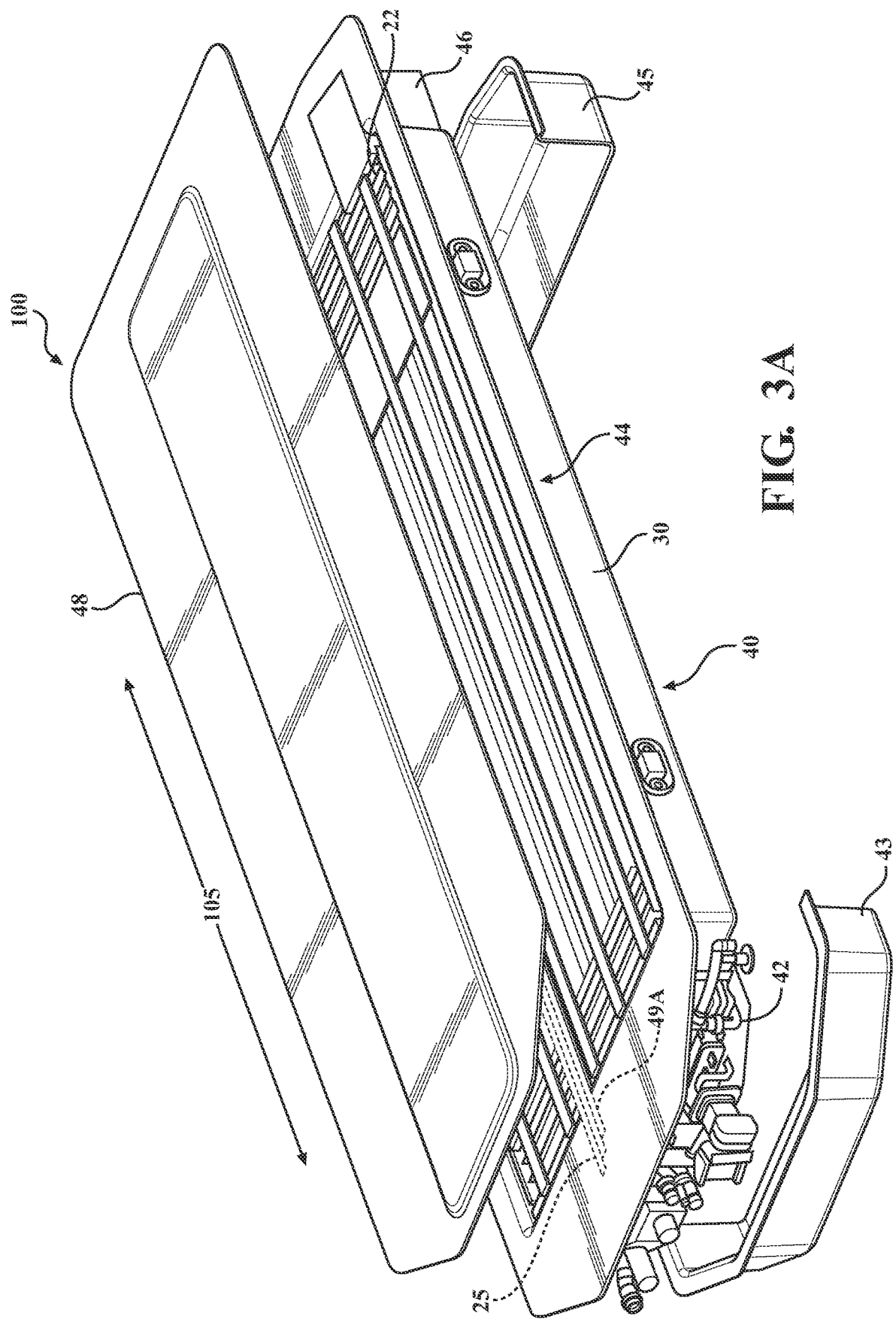
FIG. 3A is a partially exploded isometric top-side view of a first embodiment of a containment system for an RESS, in accordance with the disclosure.
Figure 3B:
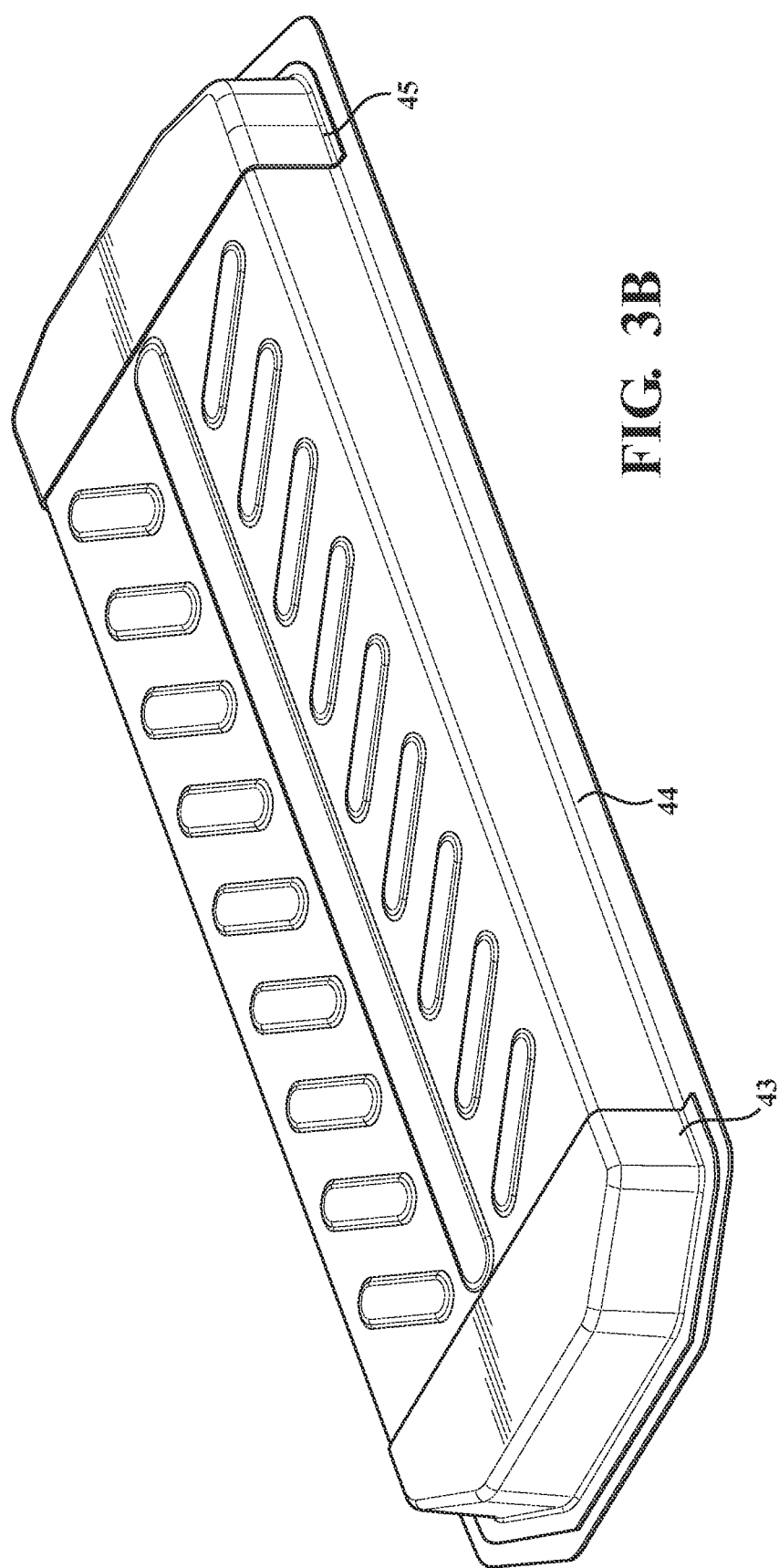
FIG. 3B is an isometric bottom-side view of the first embodiment of the containment system, in accordance with the disclosure.
Figure 3C:
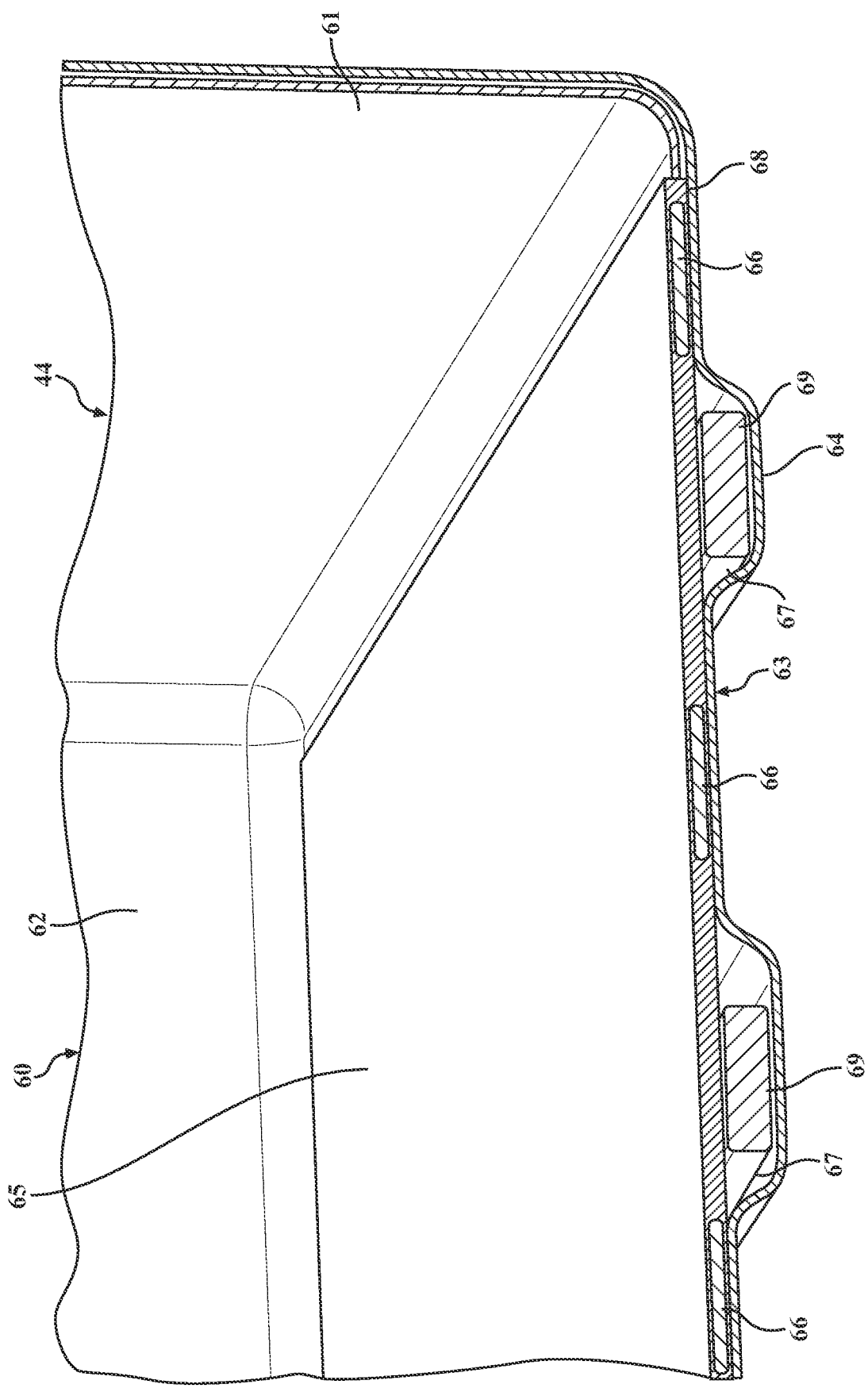
FIG. 3C is a cutaway isometric view of a portion of the first embodiment of the containment system, in accordance with the disclosure.

FIGS. 3A, 3B, and 3C schematically illustrate a first embodiment of the containment system 30 for the RESS 20 that may be employed on the vehicle 100 that is described with reference to FIG. 1.

Referring again to FIGS. 3A, 3B, and 3C, the containment system 30 includes an enclosure 40 having a first compartment 42 that is separate from and adjoins a second compartment 44, which adjoins, in one embodiment, a third compartment 46 in one embodiment. The first compartment 42 provides housing for the power electronics devices of the power inverter 24. The second compartment 44 provides housing for the plurality of battery cells 22. The third compartment 46 provides housing for the APM 26 in one embodiment. In this embodiment, the first compartment 42 is arranged in series with the second compartment 44 along a longitudinal axis 105 that is defined by the vehicle 100. The enclosure 40 may be fabricated from non-conductive composite materials, employing a long fiber or short fiber molding that create a part having multiple thicknesses to enable part strengthening, integrated sealing, thermal barriers, and heat transfer characteristics. The enclosure 40 may be fabricated employing resin transfer molding or compression molding techniques.

This arrangement of the containment system 30 incorporates composite molding techniques to produce a complete battery enclosure that has multiple compartments that accommodate different components and systems of the RESS 20, which facilitates access to individual ones of the compartments without removing the entire RESS 20 from the vehicle 100.

A top plate 48 is coextensive with an upper surface of the enclosure 40, and covers and seals the first compartment 42, the second compartment 44 and the third compartment 46. The top plate 48 is fabricated from a rigid material, e.g., a polymeric material or a metal alloy, and an insulative material, and functions to thermally and electrically isolate the RESS 20 from the adjoining portion of the vehicle 100.

The first compartment 42 is arranged on a first end of the second compartment 44, and includes mounting brackets for attaching the various elements of the power inverter 24, and mounting brackets for fluidic couplers, etc. that connect to fluidic ducts 67 in the second compartment 44. In this embodiment, the first removable access panel 43 is arranged to enclose and completely cover the elements that are arranged in the first compartment 42.

The second compartment 44 is arranged as a rectangularly-shaped open-topped tub 60 arranged as a single integral piece having an uninterrupted interior surface for containing a fluid, e.g., coolant 69. The second compartment 44 has opposed end walls 61, opposed sidewalls 62, and a bottom portion 63 that is corrugated to form channels 64. A floor plate 65 is advantageously inserted into the tub 60 and covers the bottom portion 63.

The bottom portion 63 is corrugated to form channels 64. The channels 64 provide multiple features, including enhanced structural rigidity and stiffness for load carrying capability, and formation of the fluidic ducts 67. Furthermore, the process of forming the bottom portion 63 of the tub 60 enables having varying material thicknesses. By way of non-limiting examples, a first material thickness of the floor plate 65 at a recessed location 68 may be less than a second material thickness of the floor plate 65 at the channel 64. In one embodiment, the first material thickness of the floor plate 65 at the recessed location 68 may be 3 mm to 5 mm, and the second material thickness of the floor plate 65 at the channel 64 may be 5 mm to 8 mm.

In one embodiment, the battery cells 22 are pouches or prismatic cells that define longitudinal axes that are arranged orthogonal to the longitudinal axis 105 of the vehicle 100. In one embodiment, the battery cells 22 are pouches or prismatic cells that define longitudinal axes that are arranged in parallel with (as shown) or perpendicular to the longitudinal axis 105 of the vehicle 100.

The floor plate 65 is fabricated from a material having a high coefficient of high thermal conductivity, such as copper, aluminum, steel, alloys thereof, or another material. In such embodiments, the battery cells 22 rest on the floor plate 65. In one embodiment, optional vertical heat transfer plates may be interposed between the battery cells 22 and are thermally coupled to at least a portion of the outer vertical surfaces for conductive heat transfer.

The floor plate 65 is sealingly adhered to the bottom portion 63 with an adhesive material 66, thus forming the fluidic ducts 67 between the channels 64 and the floor plate 65, as shown with reference to FIG. 3C. Heat transfer fluid, e.g., ethylene glycol, can be circulated through the fluidic ducts 67 via an external on-vehicle cooling system to effect heat transfer from the floor plate 65, which can be configured to effect heat transfer from the battery cells 22 disposed thereon.

The battery cells 22 electrically connect to the power inverter 24 and the auxiliary power module 26 via the high-voltage DC power bus 25. Slot 49A is arranged in an upper portion of one of the end walls 61 between the first compartment 42 and the second compartment 44, with an upper portion thereof defined by the top plate 48. Slot 49A accommodates a portion of the high-voltage DC power bus 25 that is arranged between the power inverter 24 and the battery cells 22. Slot 49B is arranged in an upper portion of the other of the end walls 61 between the third compartment 46 and the second compartment 44, with an upper portion thereof defined by the top plate 48. Slot 49B accommodates a portion of the high-voltage DC power bus 25 that is arranged between the APM 26 and the battery cells 22. Slots 49A and 49B are shown in detail with reference to FIG. 4C.

In this embodiment, the second removable access panel 45 is arranged to enclose and completely cover the elements of the APM 26 that are arranged in the third compartment 46.

Furthermore, in some embodiments, the arrangement of the second compartment 44 as a rectangularly-shaped open-topped tub 60 having as a single integral piece having an uninterrupted interior surface for containing a fluid, e.g., coolant enables the tub 60 including the opposed end walls 61 and opposed sidewalls 62 to define a fluidic bath. The fluidic bath includes a non-electrically-conductive fluid. The arrangement of the second compartment 44 facilitates at least partial immersion of the plurality of battery cells into the coolant to effect heat transfer.

Figure 4A:
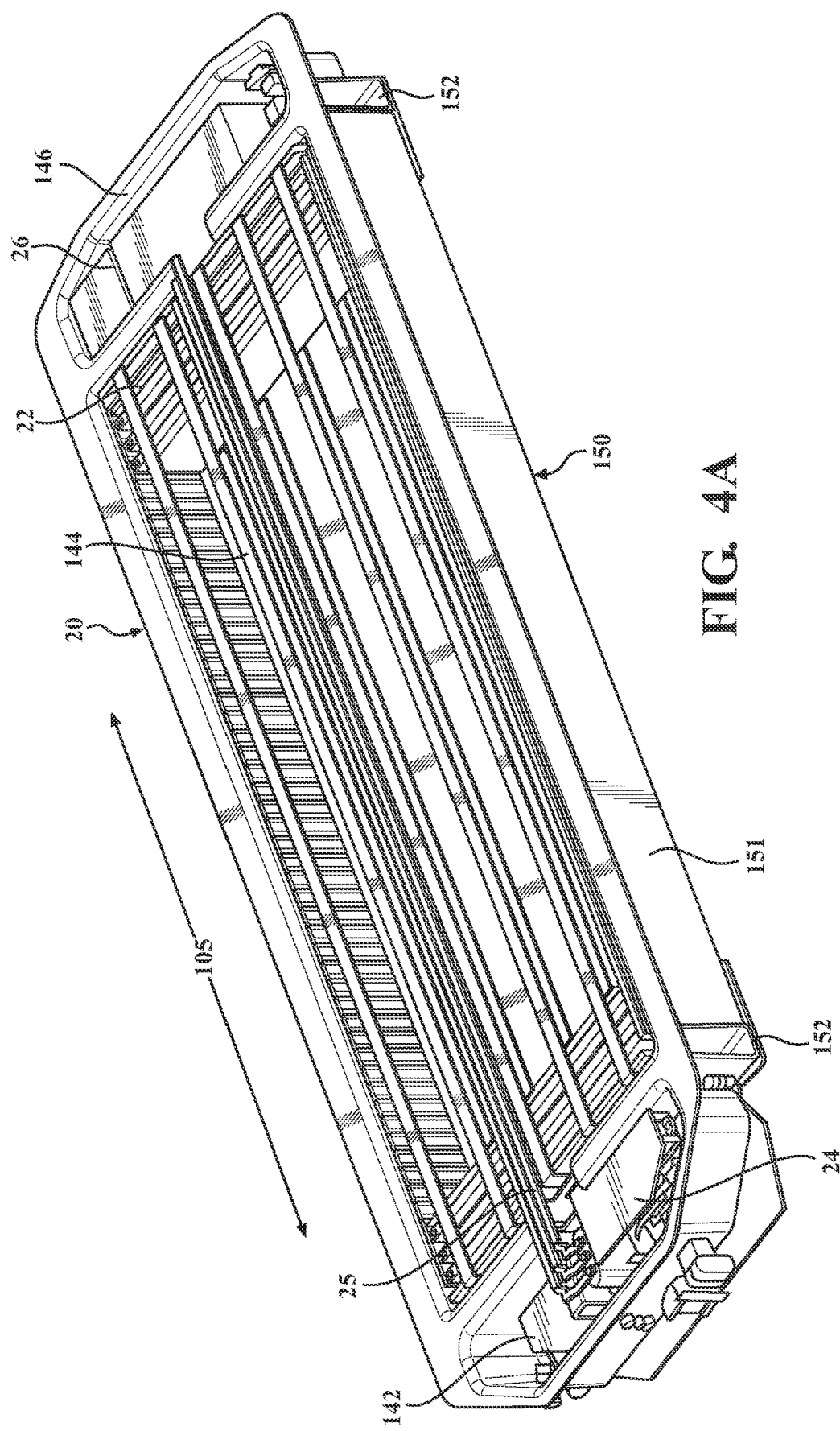
FIG. 4A is a partially exploded isometric top-side view of a second embodiment of the containment system for an RESS, in accordance with the disclosure.
Figure 4B:
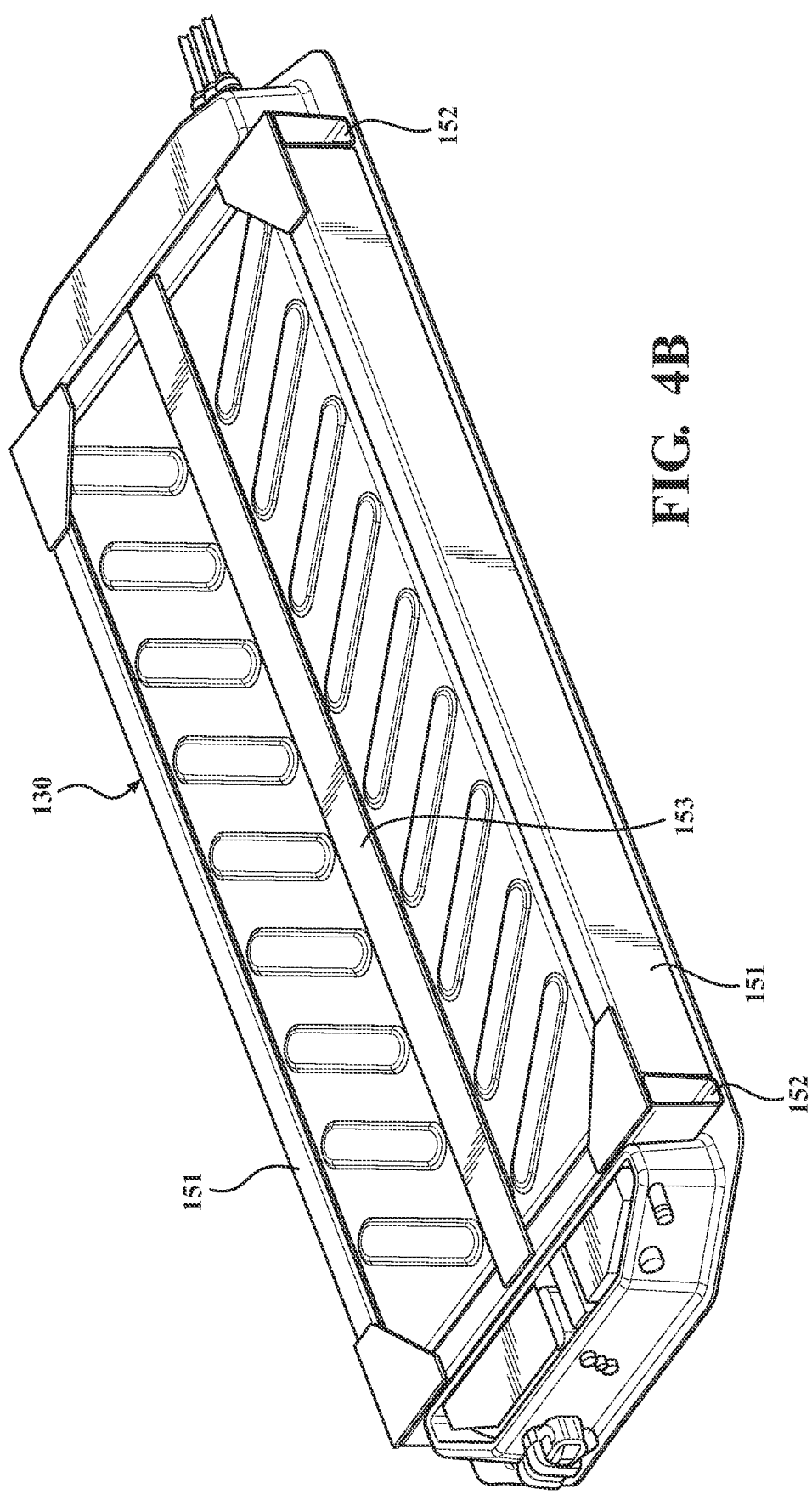
FIG. 4B is an isometric bottom-side view of the second embodiment of the containment system for the RESS, in accordance with the disclosure.
Figure 4C:
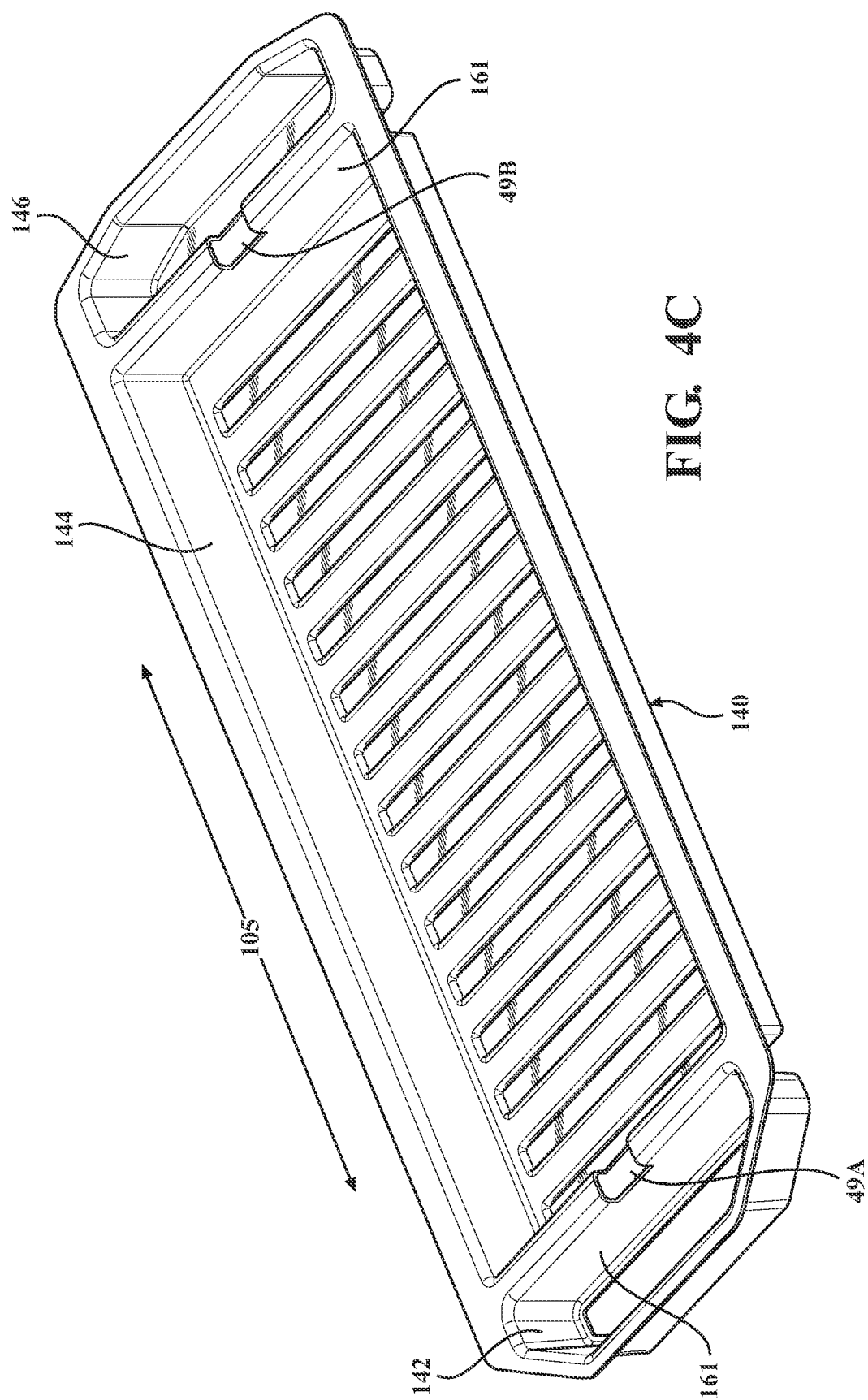
FIG. 4C is an isometric top-side view of a portion of the second embodiment of the containment system for the RESS, in accordance with the disclosure.

FIGS. 4A, 4B, and 4C schematically illustrate a second embodiment of the containment system 130 for an embodiment of the RESS 20 that may be employed on vehicle 100. The containment system 130 includes enclosure 140 having first compartment 142 that is separate from and adjoins second compartment 144, which adjoins, in one embodiment, a third compartment 146. The first compartment 142 provides housing for the power electronics devices of the power inverter 24. The second compartment 144 provides housing for the plurality of battery cells 22. The third compartment 146 provides housing for the APM 26 in one embodiment. In this embodiment, the first compartment 142 is arranged in series with the second compartment 44 along a longitudinal axis 105 that is defined by the vehicle 100.

The containment system 130 also includes a structural frame 150, which includes longitudinal beams 151, lateral beams 152, and braces 153. The longitudinal beams 151 are arranged in parallel with the sides of the second compartment 144. The lateral beams 152 are arranged in parallel with the ends of the second compartment 144. One of the lateral beams 152 is arranged between the second compartment 144 and the first compartment 142, and one of the lateral beams 152 is arranged between the second compartment 144 and the third compartment 146. The braces 153 are attached to and arranged between the lateral beams 152, and support the bottom of the second compartment 144. A single longitudinal brace 153 is shown. It is appreciated that other embodiments may have multiple braces 153, which may be longitudinally-oriented, laterally-oriented, or may be arranged diagonally. Slot 49A is arranged in an upper portion of one of the end walls 161 between the first compartment 142 and the second compartment 144. Slot 49A accommodates a portion of the high-voltage DC power bus 25 that is arranged between the power inverter 24 and the battery cells 22. Slot 49B is arranged in an upper portion of the other of the end walls 161 between the third compartment 146 and the second compartment 144. Slot 49B accommodates a portion of the high-voltage DC power bus 25 that is arranged between the APM 26 and the battery cells 22.

Figure 5:
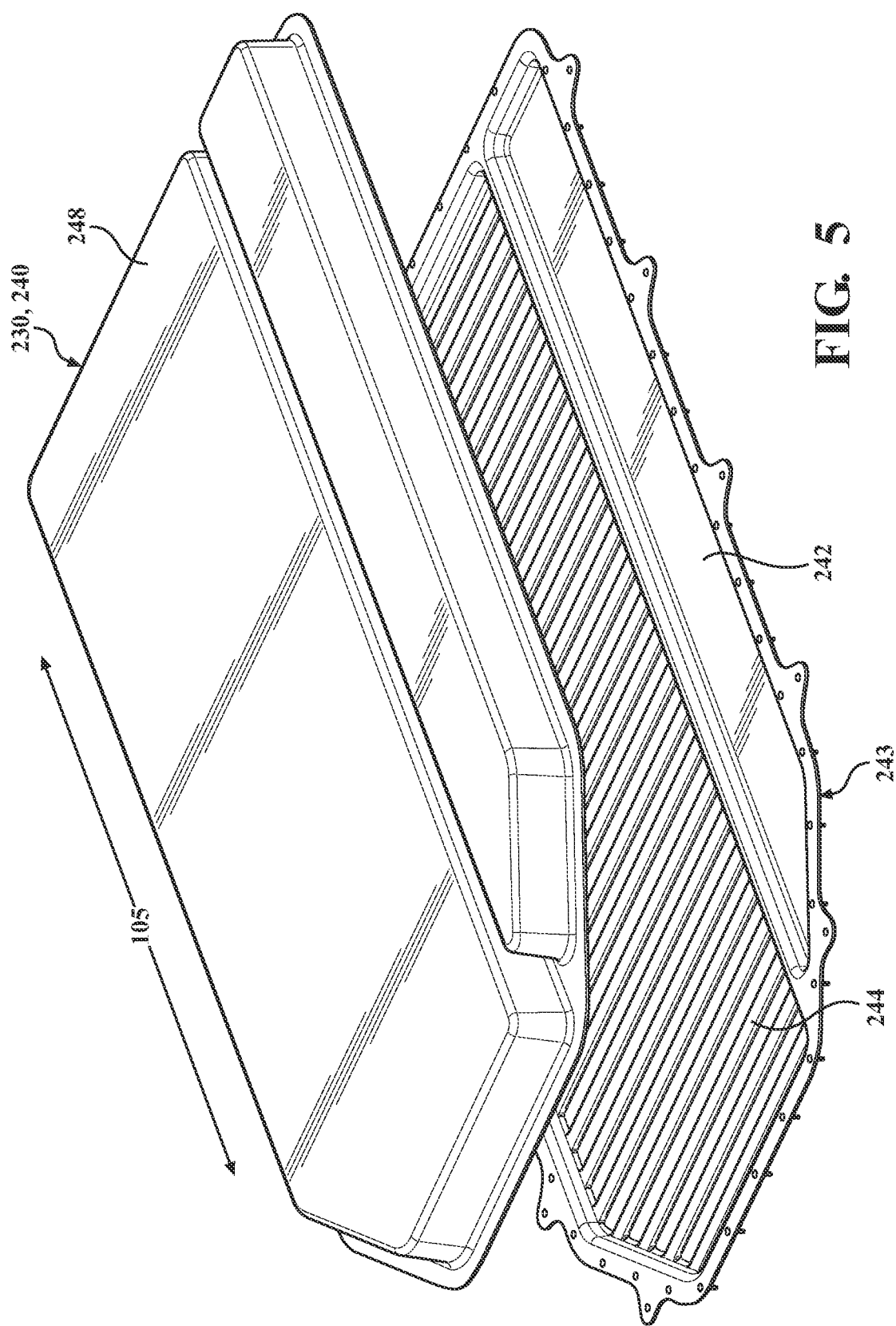
FIG. 5 is an isometric view of a portion of a third embodiment of a containment system for the RESS, in accordance with the disclosure.

FIG. 5 illustrates a third embodiment of the containment system 230 for the RESS 20. In this embodiment, the containment system 230 is a multi-compartment enclosure 240 having structural features and lower access panels. The multi-compartment enclosure 240 is arranged in a clamshell configuration that includes a lower portion 243 that joins to an upper portion 248, to form a first compartment 242, and a second compartment 244, wherein the first compartment 242 is arranged in parallel with the second compartment 244 along longitudinal axis 105 that is defined by the vehicle 100. All other elements remain unchanged, although design changes may be implemented to accommodate the change in orientation.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

While the best modes for carrying out the disclosure have been described in detail, those familiar with the art to which this disclosure relates will recognize various alternative designs and embodiments lying within the scope of the appended claims. It is intended that the matter contained in the above description and/or shown in the accompanying drawings shall be interpreted as illustrative only and not as limiting.

What is claimed is:

1. A containment system for a rechargeable energy storage system, comprising:
   an enclosure having a first compartment adjoining a second compartment;
   the second compartment including a tub defining a bottom portion, and a floor plate;
   the tub including opposed end walls and opposed sidewalls;
   a top plate arranged overtop of the first compartment and the second compartment;
   a first one of the end walls and the top plate defining a first slot between the first compartment and the second compartment;
   and
   a first removable panel arranged to enclose the first compartment;
   wherein the first compartment is arranged to house a plurality of power electronics devices for a power inverter;
   wherein the second compartment is arranged to house a plurality of battery cells; and
   wherein the plurality of battery cells connect to the plurality of power electronics devices via a high-voltage DC power bus that is arranged to pass through the first slot.

2. The containment system of claim 1, wherein the first removable panel is arranged to facilitate access to a portion of the first compartment.

3. The containment system of claim 1, wherein the first compartment is independently accessible from the second compartment via the first removable panel.

4. The containment system of claim 1, wherein the first compartment is arranged in series with the second compartment along a longitudinal axis.

5. The containment system of claim 1, wherein the first compartment is arranged in parallel with the second compartment along a longitudinal axis.

6. The containment system of claim 1, further comprising a third compartment and a second removable panel arranged to enclose the third compartment;
wherein the third compartment adjoins the second compartment.

7. The containment system of claim 6, further comprising a second one of the end walls and the top plate defining a second slot between the first compartment and the third compartment;
wherein the third compartment is arranged to house an auxiliary power module; and
wherein the plurality of battery cells connect to the auxiliary power module via the high-voltage DC power bus that passes through the second slot.

8. The containment system of claim 6, wherein the second removable panel is arranged to facilitate access to a portion of the third compartment.

9. The containment system of claim 1, wherein the bottom portion of the tub and the floor plate form a plurality of fluidic channels.

10. The containment system of claim 1, wherein the floor plate is fabricated from a material having a high coefficient of high thermal conductivity.

11. The containment system of claim 1, wherein the first compartment arranged to house the plurality of power electronics devices comprises the first compartment arranged to house a power inverter.

12. The containment system of claim 1, further comprising a load-bearing frame arranged to structurally support the second compartment.

13. The containment system of claim 1, wherein the tub including the opposed end walls and opposed sidewalls defines a fluidic bath.

14. The containment system of claim 13, wherein the fluidic bath is arranged to partially immerse the plurality of battery cells in a coolant fluid.

15. A containment system for a rechargeable energy storage system, comprising:
an enclosure having a first compartment adjoining a second compartment that is adjoining a third compartment;
the second compartment including a tub defining a bottom portion, and a floor plate;
the tub including opposed end walls and opposed sidewalls;
a top plate arranged overtop of the first compartment, the second compartment, and the third compartment;
a first removable panel arranged to enclose the first compartment; and
a second removable panel arranged to enclose the third compartment;
wherein the first compartment is arranged to house a plurality of power electronics devices for a power inverter;
wherein the second compartment is arranged to house a plurality of battery cells; and
wherein the third compartment is arranged to house an auxiliary power module.

16. The containment system of claim 15, wherein the first compartment is accessible via the first removable panel.

17. The containment system of claim 15, wherein the first compartment is arranged in series with the second compartment along a longitudinal axis.

18. The containment system of claim 15, wherein the first compartment is arranged in parallel with the second compartment along a longitudinal axis.

19. The containment system of claim 15, wherein the second removable panel is arranged to facilitate access to the third compartment.

20. The containment system of claim 15, wherein the bottom portion of the tub and the floor plate form a plurality of fluidic channels.

* * * * *